Feb. 17, 1931.    W. W. LA VAN WAY    1,792,990
AUTOMOBILE ANTITHEFT LOCK
Filed Oct. 5, 1926
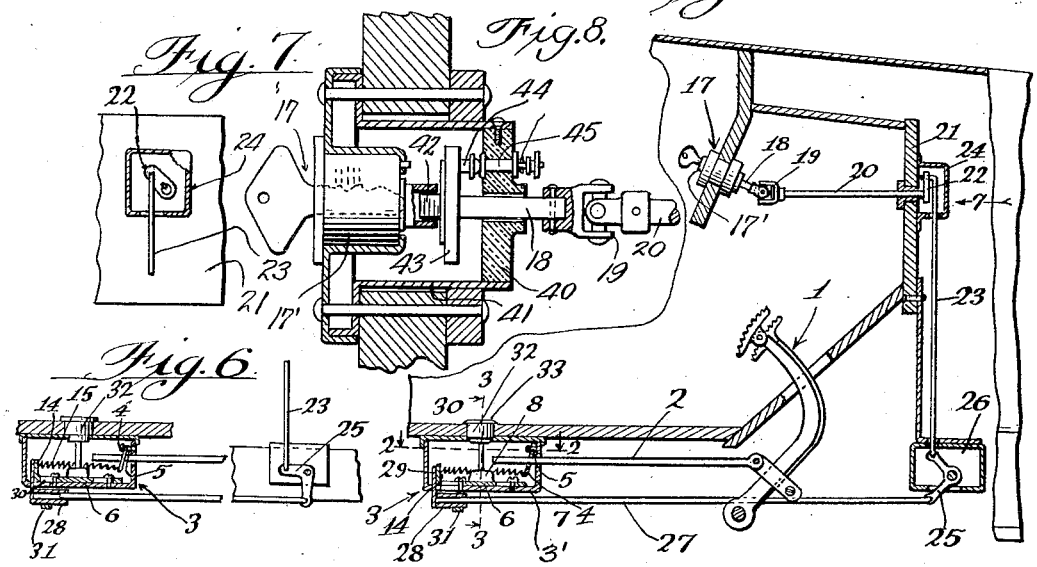
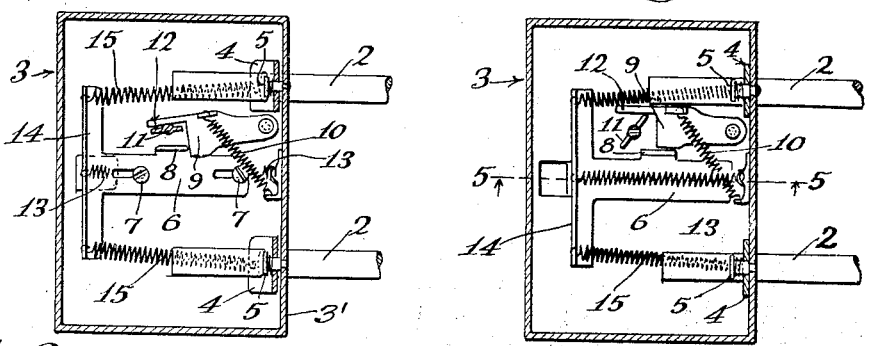
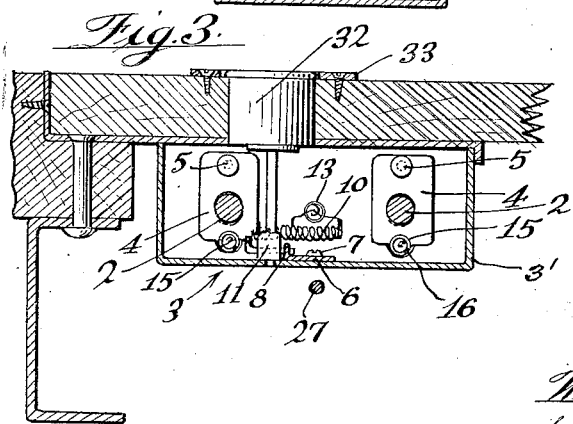
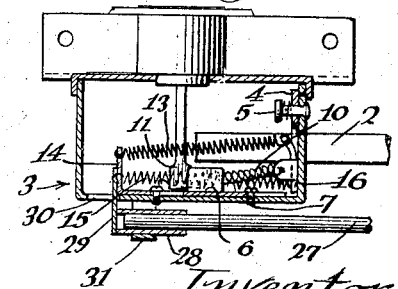
Inventor
William W. La Van Way
by Hazard and Miller
Attorneys Patented Feb. 17, 1931

1,792,990

UNITED STATES PATENT OFFICE

WILLIAM W. LA VAN WAY, OF LONG BEACH, CALIFORNIA

AUTOMOBILE ANTITHEFT LOCK

Application filed October 5, 1926. Serial No. 139,642.

My invention is an automobile anti-theft lock adapted to interlock the foot brake control, the clutch control and the ignition switch.

My invention may be considered as an improvement or an extension of my prior Patent No. 1,495,700 for automobile theft lock dated May 27th, 1924. This patent sets forth an arrangement for locking the foot brake and the foot clutch pedals so that they will be inoperative and therefore the automobile cannot be utilized. An object of my present invention is to make use of a lock having somewhat the same characteristics and in addition to interconnect such lock with the switch mechanism for the ignition so that locking or switching off the ignition automatically locks the brake and clutch pedals and whereby unlocking or switching on of the ignition itself does not unlock the brake and clutch pedals, but an additional operation of unlocking such pedals is required.

An object of my invention is the interconnecting of an ignition switch, whether controlled by a key or not, with a lock which may be utilized in connection with essential control features of an automobile so that when the ignition is switched off, the control lock is locked and prevents movement of the elements controlling the vehicle, and when the control lock is released or unlocked, as by a suitable key, the ignition switch is turned on. As an illustration of an essential control feature of an automobile I illustrate the control lock as operating to lock the clutch and the foot brake pedals, but it may be used on either one or the other if desired.

In constructing my invention I have an ignition switch which may be operated by a key or by merely a moving element which makes and breaks the usual ignition circuits, the pedals controlling the clutch and the brake, or both have rods connected thereto, and these rods are slidable in a locking mechanism somewhat of the character of my patent above mentioned. This locking mechanism when set allows depression of the pedals which would throw out the clutch, and applies the brakes, but does not allow return of these pedals to their normal position. In my construction when the ignition switch is turned so as to break or turn off the ignition circuit, this locking mechanism for the rods controlling the foot and clutch pedals is actuated and shifted into the locking position. This leaves the engine dead. If desired a person may start the engine by turning on the ignition, but this does not release the control locking mechanism for the brake and clutch pedals. The normal way of operation, however, is, when the ignition switch is turned off, for the operator to unlock the control lock, which is preferably done by a key, and this releases the locking mechanism above mentioned so that the clutch and brake pedals and the other essential operating part of the vehicle may be moved. At the same time it turns on the ignition switch so that the engine may be started.

My invention is illustrated in the following drawings in which:

Figure 1 is a sectional view through part of an automobile, indicating the lock for the brake and clutch pedals and also the interconnection with an ignition switch;

Fig. 2 is a horizontal section on the line 2—2 of Fig. 1, showing the lock for the brake and clutch pedals, this being in a locked position;

Fig. 3 is a vertical section on the line 3—3 of Fig. 1 in the direction of the arrows;

Fig. 4 is a view similar to Fig. 2 with the lock for the pedals unlocked;

Fig. 5 is a vertical longitudinal section on the line 5—5 of Fig. 4, in the direction of the arrows;

Fig. 6 is a view somewhat similar to Fig. 1, showing the ignition switch after being switched on and leaving the pedals still locked;

Fig. 7 is a detail view in the direction of the arrow 7 of Fig. 1, showing the connection of the ignition link showing the link and operating crank when the ignition switch is in the off position;

Fig. 8 is a section through a typical ignition switch of the type requiring insertion of a key.

The pedals for operating the brakes and the clutch are indicated by the numeral 1, these being pivoted in the usual manner and having locking rods 2 connected to same. The control lock is designated generally by the numeral 3. These rods pass through a control lock housing 3' which has apertures allowing their passage and are engaged by keepers 4 which are loosely hung on studs 5. Such studs allow the inward swinging of the keepers and thereby grip these rods which pass through the keepers. Such construction so far described is substantially similar to my prior patent above mentioned.

The further features of the lock construction are substantially as follows:

A slidable plate 6 is mounted in the bottom of the lock housing, being guided by studs 7 in slots in the plates. The plate has a lug 8 on one side which is engaged by a dog 9 as shown in Fig. 2, this dog being pulled constantly in one direction by a tension spring 10. When the dog is released by the key member 11 being turned and pressing against the tongue 12, moving the dog from the position of Fig. 2 to that of Fig. 4, the tension spring 13 draws the slide plate from the position of Fig. 2 to that of Fig. 4.

The plate has a cross arm 14 connected to its innermost end and tension springs 15 are connected from the end of this cross arm to the lower end of the keepers as indicated by the numeral 16. Thus when the lock is in the locked position the keepers are drawn inwardly in the position as set forth in Figs. 1 and 6. When in this position, should the brake and clutch pedals be down and released, the rods 2 connected to same may press inwardly into the lock housing, but they cannot be drawn outwardly on account of the keepers bearing on such rods. When however, the device is unlocked the keepers are as indicated in Figs. 4 and 5 allowing free passage for the rods 21 through the apertures in the lock housing and through the openings in the keepers.

The ignition switch is indicated generally by the numeral 17 having a lock barrel 17'. A shank 18 extends forwardly from the ignition switch and this shank may be directly connected to the barrel operated by the key or turning mechanism which may be rotated. This shank is connected by a universal joint 19 to a shaft 20 extending through the dash 21 of the automobile and has a crank arm 22 on its outer end. An ignition link 23 extends downwardly from the crank, this crank being enclosed preferably in a casing 24 and the lower end of the link is connected to a bell crank 25 pivotally mounted in a suitable housing 26.

An ignition switch operating rod 27 extends rearwardly from one side of the bell crank and is loosely connected to a socket 28 which has a plate 29 thereon, such plate extending upwardly through a slot 30 in the lower part of the lock casing and being connected to the center part of the cross arm 14.

The socket is guided by a bracket 31 extending downwardly from the lower part of the lock casing.

The manner of operation of the device is substantially as follows:

When the lock is in the position of Fig. 4 and the ignition switch is in the on position, the bell crank occupies the position shown in Fig. 6 and as above mentioned the keepers allows the lock rods 2 connected to the brake and clutch pedals to slide freely in and out of the lock casing. When however, the ignition switch is turned in the off position, that is, as shown in Fig. 1, the shaft 20 is operated, the crank 22 operating the link 23 and through the medium of the bell crank 25 thrusts the rod 27 rearwardly. The end of the rod engages the plate 29 and thrusts the socket rearwardly and as the socket is rigidly connected by the cross arm 14 to the slide plate 6, this slide plate is drawn rearwardly so that the lug 8 engages the dog 9 as shown in Fig. 2. The rod 27 remains in a rearward position.

It will therefore be seen that this operation of turning off the ignition automatically operates the lock which actuates the keepers 4 so that these are turned into the position shown in Figs. 1 and 6 and thereby prevent operation of the foot pedals. Should a person negligently turn the ignition switch on, or should the car be tampered with so that this is turned on by an unauthorized person, it merely moves the operating rod 27 into the forward position as shown in Fig. 6 and in which case the engine could be started but the brake and clutch pedals would still be locked in an inoperative position.

The proper manner to unlock the car is to insert the key into the lock barrel 32 of the pedal and clutch lock and by turning same through the medium of the key 11 release the dog from the lug 8 so that the slide plate 6 may move from the position shown in Fig. 2 to that of Fig. 4. In such position the plate 29 connected to the socket 28 engages the rearward end of the operating rod 27 and thrusts this forward, such rod operating the bell crank 25, the link 23, the crank 22, the shaft 20, the shank 18 and hence turning the barrel of the ignition switch and operating such switch. Therefore it will be seen that to unlock the car it is not necessary to utilize the ignition key but to utilize the key for the brake and clutch lock.

From the above construction it will therefore be seen that the clutch and brake may be locked by operating the ignition key to turn the ignition into the off position and that the ignition may be turned into the on position and the clutch and brake unlocked by use of a key in the clutch and brake lock.

While my invention has been illustrated as applied to one type of foot brake pedal and foot clutch pedal construction and to an ignition lock having a turning element, it is obvious that the features of my invention may be adapted to different types of automobile control. Therefore it may be necessary to change my invention in general construction or in specific details to accomplish such result. Such changes however, would be within the spirit of same as set forth in the description, drawings and claims.

In the specification and claims where I have used the term ignition lock or ignition key, it is to be understood that I comprehend any means for actuating the ignition of an engine from the off to the on position and vice versa. Therefore it is to be understood that my invention comprehends any arrangement by which manipulating the ignition from the on to the off position will cause the actuation of the control lock so that the car control mechanisms such as the brake and the clutch will be locked and the arrangement being such that by unlocking the control device the ignition is operated from the off to the on position.

My appliance or the equivalent thereof may be utilized in connection with automobiles which have a key for turning the ignition off or on or which do not have a key but have a lever, button or an arm etc. which may be actuated. It can also be utilized with the ignition type of locks in which a key is utilized to release the ignition switch and the switch is operated independent of the key after the key has been turned.

By the designation ignition lock I do not mean merely the barrel 17' or other detail mechanism which may be operated by a key, but I intend this to comprehend any type of a switching or locking mechanism which may control the ignition circuit for an automobile. It is apparent that as an electric circuit is opened and closed by this ignition lock, that the same mechanism may be utilized for any electric circuit in connection with an automobile, such as the starting circuit, and in addition the switch may control the lights.

By the designation control lock I do not mean merely the barrel lock 32 but the whole mechanism for locking the control levers. In the illustration of an adaptation of my invention I show these control levers as being the foot brake and the clutch but it is to be understood that other parts to be controlled which are essential to the operation of the car could similarly be locked.

In Fig. 8 I show a type of ignition switch which is designated generally by the numeral 17 and has a barrel 17'. In connection with this switch I utilize an insulating plate 40 at the rear part of the switch housing 41, and through this there is journaled the shank 18, which shank at its forward end is connected to the barrel of the lock by a socket and tongue connection 42, the barrel being turned by a key and turning the socket construction. The electrical features comprise a disc 43 mounted on the shank and having a contacting nub 44 which is adapted to engage a plurality of fixed contacts 45 mounted on the insulating plate 40.

If the ignition switch is turned off, that is, into the position shown in Fig. 1, the crank 22 is rocked to the position shown in Fig. 7; thus drawing up on the link 23 and rocking the bell crank 25, which action causes the rod 27 to move towards the rear, the end of which rod abuts against the plate 29 connected to the cross arm 14 and moves this arm rearwardly, exerting a tension on the springs 15 and shifting the keepers 4 to the positions shown in Figs. 1 and 6. At the same time the dog 9 is pulled laterally by the spring 10 so that it engages with the lug 8. When the keepers are in this position, the pedals may be thrust downwardly, drawing the rods 2 out, but these rods cannot move inwardly; therefore the pedals will be maintained down. This will hold the clutch out and the brakes applied.

Presuming it is desired to start the engine without releasing the clutch and brakes, the ignition switch may be turned from the off to the on position by inserting the key in the barrel. This draws the rod 27 forwardly into the position shown in Fig. 6 but the keepers 4 are still left in their locking position. This, however, is not the normal action in placing the machine in the condition for using.

Normally, the ignition switch is left in the turned off position and if desired the key may be left in the barrel lock as using the key to turn the switch on will only allow operation of the engine but not the clutch or brakes.

With certain types of ignition switch it is necessary to leave the key in the lock and this is an advantage as in an attempted theft of the car the person so attempting usually turns on the ignition switch and when on throwing out the clutch and on applying the brakes the person would find that the clutch remains out and the foot brakes remain set, the person attempting to steal the car would then generally leave the vehicle without any further attempts.

With some types of locks used on the ignition it is not necessary to leave the ignition key in the lock as the rotatable part of the lock may be turned from the back whether there is a key in the lock or not and thus the operation of the control lock from the locked to the unlocked position may switch the ignition from the off to the on position. Then when a key is inserted in the lock barrel 32 and turned, that is, being shifted from the position shown in Fig. 2 to that of Fig. 4, the dog is released from the lug 8, allowing the springs 15 to draw the cross bar 14 forwardly, and the keepers to drop into the vertical position. This action causes the plate 29 to thrust forwardly on the rod 27 which operates the bell crank 25, and thence through the motion transmitting mechanism to rotate the ignition switch to the on position; thereby the engine is ready for operation and the foot and brake pedals may be actuated.

It is to be understood that the control lock refers to a suitable lock which may lock a moving device, such as a rod which is connected to an essential part of a vehicle control mechanism, this being illustrated as connected to a clutch pedal and to a brake pedal. Hence, by my construction, by turning off the ignition and stopping the engine, the essential control mechanism is automatically locked and on unlocking this control mechanism by a key or other device, the ignition switch is automatically turned on and the essential control device is free for operation. Also if it is merely desired to operate the engine with the control mechanism still locked, the ignition switch may be turned on and still leave the essential control device inoperative.

Having described my invention, what I claim is:

1. In combination with clutch and brake pedals, locking rods connected to same, a lock casing having apertures therethrough through which the said rods extend, pivotally mounted keepers having apertures fitted on said rods, a sliding element, means resiliently connecting same to the keepers, a latching mechanism for said sliding element, an ignition switch, means controlled by turning said ignition switch to the off position to shift the sliding element and actuate the keepers to lock the locking rods.

2. In combination with clutch and brake pedals as claimed in claim 1, the means actuated by the ignition switch comprising a motion transmitting mechanism including a turnable shaft and slidable operating rod, a socket element connected to the slidable element, the operating rod engaging said socket, whereby the turning of the ignition switch to the off position slides the slidable element to lock the keepers and means to release the latching mechanism allowing reverse motion of the slidable element causing the socket to operate the operating rod in a reverse direction and through the turnable shaft turn the ignition switch to the on position.

3. In combination with an automobile having a device to control mechanism for operating the automobile, a control lock to lock said device, an ignition switch, means to lock the control lock by operating the ignition switch from an on to an off position, and means to actuate the ignition switch from an off to an on position by unlocking the control lock.

4. In combination with an automobile having a lever for controlling the automobile, a control lock, means interengaging the control lock and lever to prevent the operation of said lever, an ignition switch, means interconnecting the ignition switch and control lock to lock the control lock by actuating the ignition switch from an on to an off position, said means on actuating the ignition switch from the off to the on position leaving the control lock in the locked position.

5. In combination with an automobile as claimed in claim 4, the control lock having means actuated thereby on unlocking to shift the ignition switch from the off to the on position.

6. In an automobile the combination of a pedal, a locking rod connected thereto, a control lock for locking said rod, an ignition switch, means interconnecting the control lock and the switch to place the lock in the locking position by operating the ignition switch from an on to an off position, said control lock being left in locked position by actuating the ignition switch from the off to the on position.

7. In an automobile, as claimed in claim 6, the control lock having means to unlock said rods and having means to shift the ignition switch from the off to the on position.

8. In combination with an automobile, a plurality of pedal levers having rods connected thereto, a control lock for controlling said rods, an ignition switch, means to lock the control lock by turning the ignition switch from the on to the off position, and means actuated by unlocking the control lock to turn the ignition switch from the off to the on position.

9. An automobile, as claimed in claim 10, an ignition switch, means interconnecting the switch and the slide plate to slide said plate on actuating the ignition switch from the on to the off position, said means being adapted to return the ignition switch from the off to the on position on releasing the said dog and the sliding of the slide plate to its unlocked position.

10. In combination with a plurality of pedals having locking rods, a control lock for said rods having a sliding element, an ignition switch, a motion transmitting mechanism connected to the ignition switch including an operating rod engaging in a socket, said socket being connected to the sliding element of the control lock whereby actuating the ignition switch from the on to the off position actuates the sliding element of the control lock to lock the said rods.

11. In combination with a plurality of pedals, as claimed in claim 10, having means in the control lock to engage and disengage the sliding element, resilient means to slide said element, the socket engaging the operating rod and reversing the motion of the ignition switch turning the same from the on to the off position.

12. In combination with an automobile, means to control the operation of the automobile, a control lock to lock and unlock said means, an electric circuit for the operation of the automobile, means to open and close said circuit and means operable by opening of the circuit to lock the control lock.

13. In combination with an automobile, means to control the operation of the automobile, a control lock to lock and unlock said means, an electric circuit for the operation of the automobile, means to open and close said circuit and means operable by opening of the circuit to lock the control lock, and means operated by unlocking the control lock to close the said circuit.

14. In combination with an automobile, means to control the operation of the automobile, a control lock to lock and unlock said means, an electric circuit for the operation of the automobile, means to open and close said circuit and means operated by unlocking the control lock to close said circuit.

15. In combination with an automobile having means to control the operation of the automobile, a control lock for such means, a switch to switch an electric circuit on and off, means to lock the control lock by actuating the switch from the on to the off position, and means to operate such switch from the off to the on position by unlocking the control lock.

16. In combination with an automobile, means to control the operation of the automobile, a control lock to lock said means, an electric switch to switch an electric circuit on and off, a switch actuating device, means operated by the switch actuating device when switching the current from the on to the off position to lock the control lock, and means operated by unlocking the control lock to actuate the switch from the off to the on position.

17. In combination with an automobile, a control lever for the automobile, a rod connected to said lever, an electric circuit, operating means to switch the circuit off and on, a control lock to lock said rod, and means operated by the said operating means to lock the control lock in switching said circuit from the on to the off position.

18. In combination with an automobile, a control lever for the automobile, a rod connected to said lever, an electric circuit, operating means to switch the circuit off and on, a control lock to lock said rod, means operated by the said operating means to lock the control lock in switching said circuit from the on to the off position, and means actuated by unlocking the control lock to actuate the switch operating mechanism from the off to the on position.

19. An automobile having in combination brake and clutch pedals with locking rods connected thereto, a control lock having keepers through which the rods slide, a slide plate resiliently connected to said keepers, a spring connecting said slide plate to a fixed structure, a pivotally mounted dog positioned to engage the said slide plate on locking of the control lock, a member connected to said control lock to trip the dog into disengagement from the slide plate and release the plate to allow sliding of the plate and through movement of said plate releasing the keepers from the locking rods.

20. In combination with an automobile, means to control the operation of the automobile, a control lock to lock and unlock said means, an ignition switch for an electric circuit, means to open and close said switch, and means operable by the opening of the switch to lock the control lock.

21. In combination with an automobile, means to control the operation of the automobile, a control lock to lock and unlock said means, an ignition switch for an electric circuit, means to open and close said switch, means operable by the opening of the switch to lock the control lock, and means operated by the unlocking of the control lock to close the ignition switch.

22. In combination with an automobile, means to control the operation of the automobile, a control lock to lock and unlock said means, an ignition switch for an electric circuit, means to open and close said switch, means operable by the opening of the switch to lock the control lock, and means operated by the unlocking of the control lock to close the said switch.

23. In combination with an automobile, means to control the operation of the automobile, a control lock to lock and unlock said means, an ignition switch for an electric circuit, means to open and close said switch, and means operated by unlocking the control lock to close the said switch.

In testimony whereof I have signed my name to this specification.

WILLIAM W. LA VAN WAY.